United States Patent [19]

Delatorre

[11] Patent Number: 5,168,419
[45] Date of Patent: Dec. 1, 1992

[54] CAPACITOR AND PRESSURE TRANSDUCER

[75] Inventor: Leroy C. Delatorre, Sugar Land, Tex.

[73] Assignee: Panex Corporation, Sugar Land, Tex.

[21] Appl. No.: 730,694

[22] Filed: Jul. 16, 1991

[51] Int. Cl.[5] .......................... G01L 9/12; G01L 7/04
[52] U.S. Cl. ........................................ 361/283; 73/733
[58] Field of Search ................. 73/718, 724, 733, 735; 361/283

[56] References Cited

U.S. PATENT DOCUMENTS

| | | | |
|---|---|---|---|
| 4,719,538 | 1/1988 | Cox | 361/283 |
| 4,870,536 | 9/1989 | Delatorre | 361/283 |
| 4,873,870 | 10/1989 | Delatorre | 73/733 |

Primary Examiner—Donald A. Griffin

[57] ABSTRACT

A dual capacitor device for utilizing dependent capacitances for measurement purposes where an upper capacitor base member and a lower capacitance base member are arranged with parallel capacitor surfaces in horizontal planes and where the parallel capacitor surfaces are located on opposite sides relative to a vertical axis to define first and second capacitors. The lower capacitor base member has a centrally located section connected to an outer section of the lower capacitor base member by a torsion beam and the centrally located section is attached to the upper capacitor base member by a vertical arm member. The torsion beam means has a displacement axis normal to the central axis so that angular displacement of the torsion beam and the centrally located section about the displacement axis produces a capacitance change in the first and second capacitors. A force moment applied to the centrally located section by a spirally wound bourdon tube in response to pressure develops a low force on the torsion beam which is less than the micro yield point of the torsion beam material and develops a micro dimensional angular displacement of the centrally located section and a capacitance change as a function of the force to measure high pressures with small deflections of the capacitor. The structure is arranged to compensate for changing temperature.

33 Claims, 8 Drawing Sheets

CAPACITOR AND PRESSURE TRANSDUCER

FIELD OF THE INVENTION

This invention relates to capacitors and pressure transducers and more particularly to relatively small capacitors utilizing microdisplacements for use in high pressure transducers requiring a wide pressure range of operations under changing temperature conditions and for producing pressure measurements with a high degree of accuracy.

BACKGROUND OF THE INVENTION

While the present invention finds particular usefulness in the oil industry, it has particular application in other hostile pressure and temperature environments where size and accuracy are important. In an oil well pressure transducer, it is common to size a unit to go into a small diameter metal pressure housing for measurement of pressures up to 20,000 psi and even more and which can be exposed to downhole temperatures up to 400° F. or more. The pressure housing must have a wall thickness sufficient to withstand the downhole pressures so that the O.D. of the internal pressure transducer is in the neighborhood of one inch.

A downhole oil well pressure gauge can be transported by a wireline, cable or pipe string to one or more levels of interest in a well bore where both temperature and pressure are sensed over a period of time. Typically, pressure measurements are repeatedly sampled and recorded over a period of time at a sampling rate determined by down hole electronics and may be stored in a downhole memory for subsequent replay or sent to the surface for analysis. Alternately, sometimes gauges are attached to production strings or other downhole equipment for extended periods of time or "permanently". In both uses of the gauge, sudden downhole pressure changes can also typically be accompanied by a temperature change in a relatively short period of time. It is also important for the accuracy of the pressure sensor to not change its calibration over a period of time in the borehole in response to pressure or temperature effects in the boreholes. Thus, there is a need for a pressure gauge for high pressure measurements which is also insensitive to sudden changes in temperature or effects of pressure. The present invention relates to high pressure transducers which can accurately measure high pressure changes under transient temperature conditions. The invention is also applicable to low pressure designs.

Under the combined effect of high temperature and pressure conditions, the typical pressure sensor structure is subjected to high stress by the applied high pressure and subjected to high temperature both of which cause creep in the materials. Creep in materials tends to be exponentially related to both temperature and stress levels. The effect of creep or permanent deformation is to alter the calibration or measurement characteristics of a sensor and cause the sensor to obtain inaccurate measurements from its calibration standard over a period of time.

Heretofore, capacitance type transducers have been utilized for pressure measurements where a downhole oil well pressure varies an electrical capacitance as a function of pressure. The pressure is translated to a capacitance measurement by a pressure diaphragm moving parallel arranged capacitance plates toward and away from one another. An example of this kind of device is shown in U.S. Pat. No. 4,322,775.

I have also coupled a bourdon tube to a capacitance type of sensor as disclosed in U.S. Pat. No. 4,873,870 in which sensor system, the pressure in the bourdon tube generates a directional linear force to displace quartz supported parallel arranged capacitor elements toward and away from one another. While this device is satisfactory for a number of applications, it is a difficult unit to manufacture.

In the present invention, I have developed a capacitor device which has a unique relationship of capacitors and can be constructed from metals to respond to low force inputs and be relatively insensitive to temperature changes. The capacitor device is particularly adaptable to high pressure measurements with a high degree of accuracy.

SUMMARY OF THE INVENTION

In the present invention, dual capacitors are defined by spaced apart horizontal capacitor plates respectively located on capacitor base members. The capacitor plates for each capacitor are disposed at equally offset locations relative to a central vertical axis for the device. One of the capacitor base members can be angularly displaced about a horizontal displacement axis by an applied torque force to dependently vary the respective capacitance of the capacitors. The angular displacement is obtained by a spirally wound bourdon tube which, when subjected to internal fluid pressure, produces a force on a moment arm attached to the angularly displaceable capacitor base member.

The bourdon tube is attached between the moment arm and a reference base member to provide the moment force to the moment arm. Although the bourdon tube can be subjected to high pressures, the stress levels in the metal bourdon tube can be designed to be well within its elastic limits because only a low force is required and the angular displacement of the capacitor base member is in micro measurements. Thus, creep and permanent distortion in the material which is caused by stress are minimized in the system. Further, the effect of bourdon tube creep is reduced by the constraining effect of the torque beam to be described more fully hereafter.

By arranging a capacitor base member so that related capacitances between capacitor plates are varied as a function of an angular relationship of the capacitor plates relative to a mid-plane, a high capacitance sensitivity can be obtained with low angular deflection. That is, a micro dimensional change in the capacitor gap produces a defined measurement parameter. The high sensitivity is obtained by measurement of a small displacement of the capacitor plates at a significant distance from the center of angular displacement (the displacement axis). The elastic characteristics of a metal torque beam means coupled to the force end of the spirally wound bourdon tube by a moment arm become the primary determining element relative to elastic properties.

The reason that the beam means is a primary determining element is that the deflection of the bourdon tube is restrained by the beam means to be a small fraction of the unrestrained deflection of the bourdon tube. Thus, the deflection of the bourdon tube is controlled by the elastic characteristics of the beam means and the bourdon tube becomes essentially a pressure to force converter. By using a low driving torque force of a bourdon tube (even for high pressure) and a minute angular deflection of the beam means, the stress levels in the bourdon tube and particularly in the torque beam means can be kept well within micro-elastic limits. High performance metal alloys can then be used to provide correspondingly higher micro yield values so that near perfect elastic characteristics are attainable in the operating range of the transducer.

Temperature is an important factor because it can affect the calibration of the sensor. While a pressure measuring device at an ambient temperature can be generally corrected by measured temperature, a change of temperature from an ambient value can thermally affect the response of the pressure measuring device to pressure which affects the accuracy of the pressure measurement. Changes in temperature often occur with changes in pressure so it is important to accurate pressure measurement for the pressure measuring device to be insensitive to changing or varying temperatures or to compensate for the changing temperatures.

In the present invention, aligned metal torque beams support a lower capacitor base member which is coupled to a moment arm where the moment arm extends vertically between an upper capacitor base member and a bourdon tube where the bourdon tube is below the lower capacitor base member. The torque beams have a rectangular cross section and are aligned with a horizontal displacement axis which intersects the vertical axis of the moment arm. The non symmetrical cross section of the torque beams allows for large rigidity in the direction of the long cross sectional dimension without greatly increasing the torsional rigidity. When the long cross sectional dimension is aligned perpendicular to the capacitance plates, the long cross section reduces the effect of temperature expansion of the bourdon tube on the displacement of the capacitor plates. Any linear deflection of the torque beam in the direction of the short rectangular cross section dimension does not result in any significant capacitance response since the gap length of the capacitor plates does not change. Therefore, horizontal linear deflections of the bourdon tube are rejected. The capacitor structure is arranged with tortuous paths for isolation of the capacitors from the effects of temperature changes.

The effect of temperature on the modulus of elasticity of the torque beams due to material selection can be largely eliminated by use of a compensation spacer to adjust the capacitance gap in response to temperature changes as taught in the technology disclosed in U.S. Pat. No. 4,322,775.

DESCRIPTION OF THE PRESENT INVENTION

Figure 1:
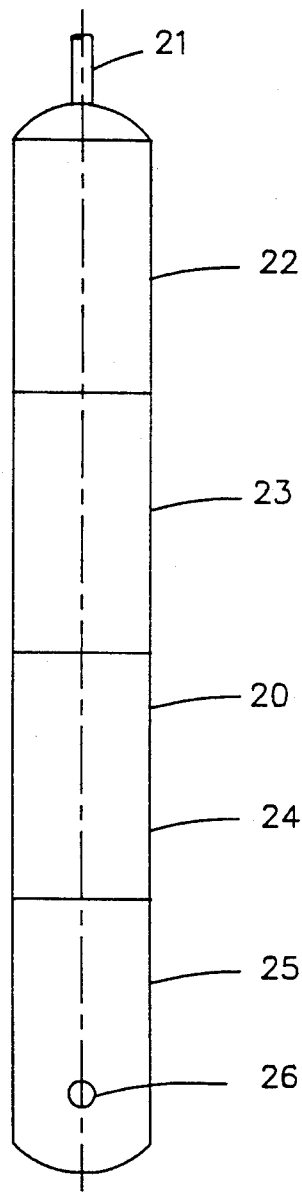
FIG. 1 is a typical arrangement for an oil well pressure measuring device as found in current use.

By way of background, as shown in FIG. 1, a downhole cylindrically shaped well tool 20 is sized for insertion through a small diameter well tubing and adapted for coupling to the end of a wireline cable 21. The cable 21 extends to a surface located spooling reel or drum (not shown). The tool 20 generally includes a DC battery pack section 22, as a source of electrical power, an electronic section 23 with electrical circuitry for electrically processing and for providing electrical power, a temperature sensor section 24 with a temperature probe for sensing temperature and a pressure sensor section 25 with a pressure transducer for sensing pressure. An opening 26 admits fluid under pressure to the pressure sensor or the transducer in the sensor section 25. For further reference purposes, see U.S. Pat. No. 4,763,259.

In permanent gauge installations the temperature and sensor sections are incorporated with downhole equipment for permanent position or location in a well bore.

Figure 2A:
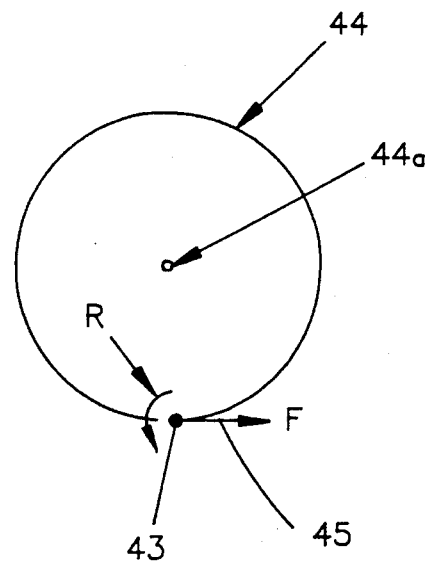
FIG. 2A is a schematic illustration of some of the forces involved in the measuring system.
Figure 2:
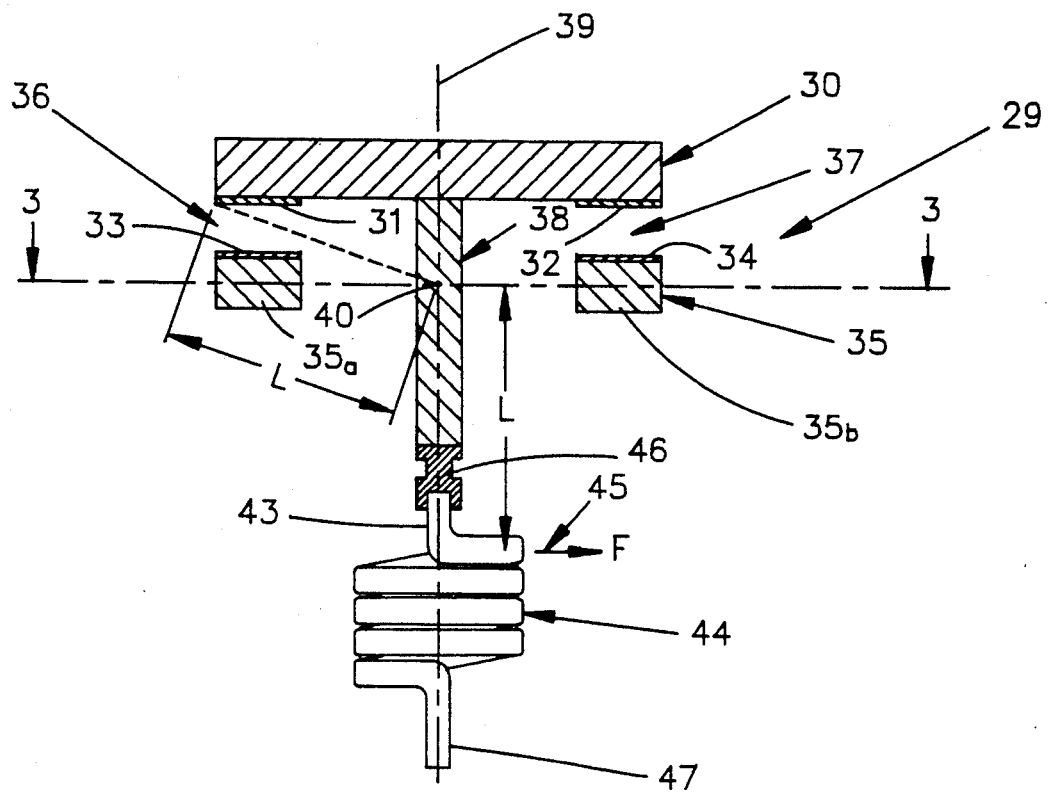
FIG. 2 is a schematic view in cross section of the invention to illustrate the concept of measuring system of the present invention.
Figure 3:
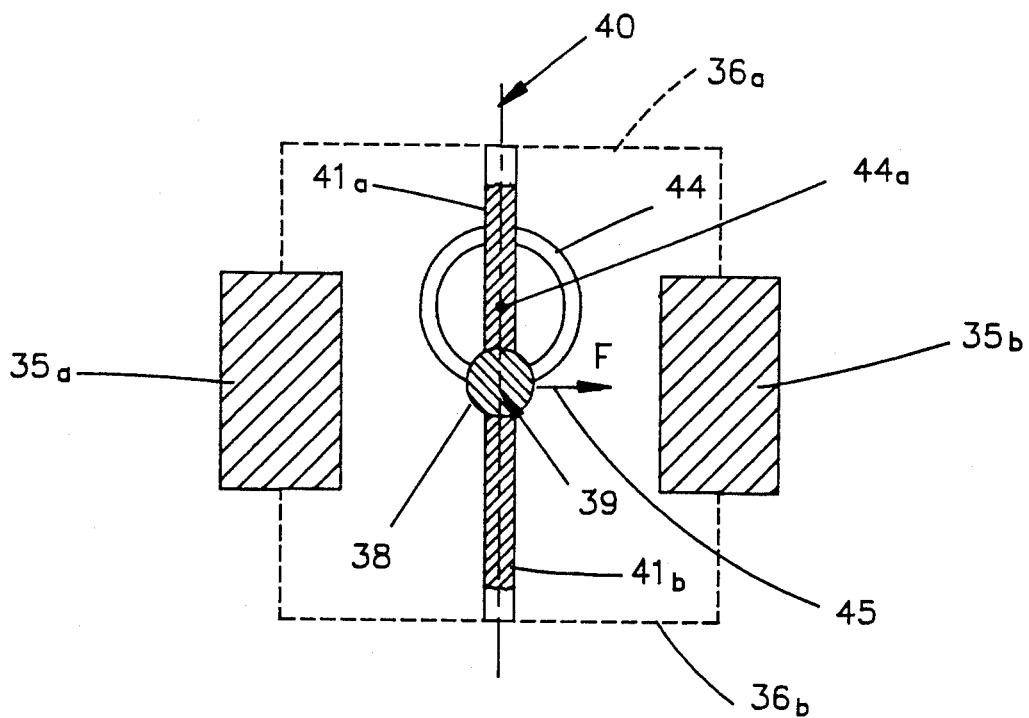
FIG. 3 is a schematic partial view in cross section taken along line 3—3 of FIG. 2.

Referring now to FIG. 2 and FIG. 3, the operating concept of the apparatus of the present invention is schematically (but disproportionally) illustrated for descriptive purposes. A capacitance transducer 29 has an upper base member 30 with electrical capacitance plates 31,32 which are spacially disposed in a parallel relationship relative to opposing electrical capacitance plates 33,34 on spaced apart portions 35a,35b on a lower capacitor base member 35 (partially shown) to define capacitance gaps 36,37. While the capacitance plates 33,34 are illustrated separately from the base member 35, the plates can be the metal base member itself in an electrically grounded capacitance arrangement.

The upper base member 30 is attached at a center point to a transverse vertical support or moment arm member 38 which extends longitudinally along a vertical axis 39. A horizontal torque or displacement axis 40 is located in a median horizontal plane extending through the lower base member 35 and intersects the longitudinal axis 39 (see also FIG. 3). The axis 40 in FIG. 2 is perpendicular to the plane of the drawing.

As shown in FIG. 3, transverse, horizontally extending torsion beam members 41a,41b are located between the base member portions 35a,35b and are attached to the vertical moment arm member 38. The torsion beam members 41a,41b are rectangular in cross section and also connect to the base member portions 34a,35a (see dashed lines 36a,36b on FIG. 3). In FIG. 3, the vertical axis 39 lies in a vertical plane which bisects the beam members 41a,41b. The displacement axis is centrally located in the cross section of the beam members, lies in the vertical plane and intersects the vertical axis 39 in a transverse direction. Thus, the beam members 41a,41b extend along the displacement axis 40 and are arranged to be torqued about the displacement axis by the arm member 38.

As shown in FIG. 2, the lower end of the moment arm member 38 is connected by a force coupler 46 to a bourdon tube 44. The force coupler 46 has a blind bore to receive a vertical stub or closed end 43 of the spirally wound bourdon tube 44. For explanation purposes, the distance "L" between the displacement axis 40 and the ends of the capacitor plates 31,32 can be made equal to the distance "L" between the displacement axis 40 and a force axis 45 which is located at the end of the bourdon tube 44. Thus, for each displacement unit along the force axis 45, an equal displacement unit is developed at the end of the capacitor plates.

It can be appreciated that the rotative displacement of the plates 31 and 32 relative to the corresponding plates 33 and 34 can decrease one gap 36 while increasing the plate spacing of the other gap. Thus, separate capacitors respectively utilizing the capacitance plates 31,33 and 32,34 will have dependently related capacitance changes in response to rotative displacement. As will be discussed herein, the displacement is in microdimensions which reduces the stress in the tension beams.

The bourdon tube 44 has a flattened cross section between the location of the force axis 45 and the entrance end of the tube at 47. In response to internal pressure, the bourdon tube 44 produces a torque force or force moment (see arrow along force axis 45) which acts to torque the moment arm 38 about the displacement axis 40 for the beam members 41a,41b. The force moment will angularly displace the vertical moment arm member 38 and move the upper base member 30 about the displacement axis 40 to change the relative spacing of the capacitance gaps 36,37 and change the capacitance of the two capacitors as a function of the pressure in the bourdon tube 44. Because the dimensions "L" are equal, the displacement of the ends of the capacitor plates 31 is equal to the displacement of the moment arm 38 by the bourdon tube along the axis 45. The vertical axis of the stub end 43 of the bourdon tube is aligned with the vertical axis 39. The input end 47 of the bourdon tube 44 is aligned with the vertical axis 39. The bourdon tube is spirally wound and its coil axis 44a is offset to one side of the longitudinal vertical axis 39. The coil axis 44a is located in the vertical plane defined by the axes 39 and 40.

As described above, the bourdon tube produces a force F as the bourdon tube tends to uncurl or expand about its coil axis 44a. (See FIG. 2A for schematic illustration). The uncurling effect produces a rotational effect (shown by the arrow R in FIG. 2A) about the force axis 45. The rotational force coupler 46 (see FIG. 2) connected between the stub end 43 of the bourdon tube 44 and the moment arm 38 permits the rotational effect of the stub end 43 to occur. The force coupler 46 has a rectangular cross section with a long dimension parallel to the direction of the force axis 45 so that the force coupler 46 is stiff and will not bend in response to the torque force.

From the foregoing basic illustration of a concept of the present invention, a bourdon tube is utilized to develop a low force in response to high pressure which acts on a moment arm to torque the beam members about a displacement axis and produce a micro dimensional deflection of the capacitors. By maintaining the deflection within the micro elastic characteristics of the material for the beam members and utilizing low measurement forces, the stress levels in the beam members can be kept low which permits high accuracy measurements. The high accuracy measurements are obtainable because permanent distortion of the displacement material usually associated with materials under stress does not appreciably occur. Material criterion for the torsion beam is that the material should have a micro yield point which is above the stress level produced by a torque force.

Figure 4:
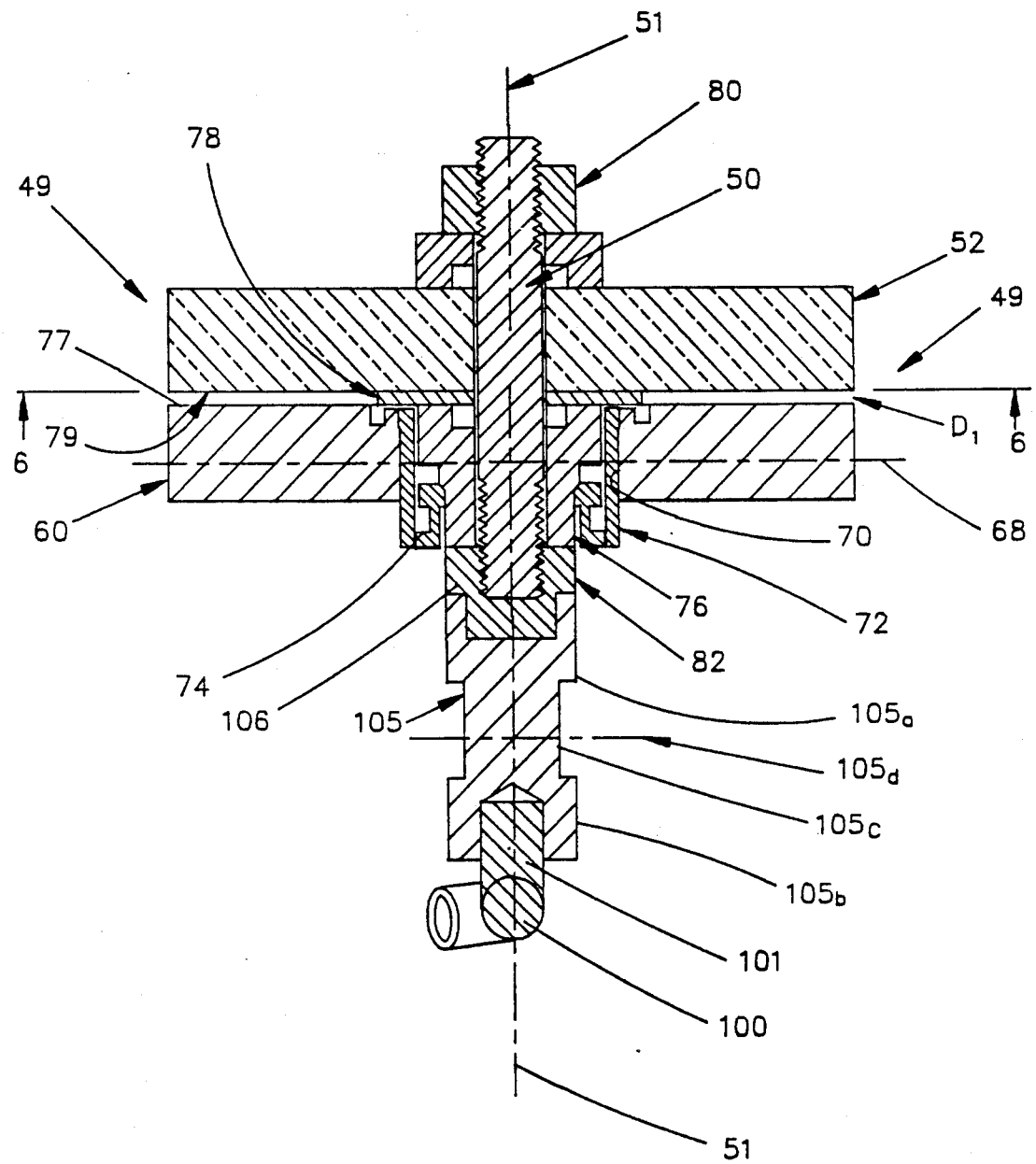
FIG. 4 is a view in longitudinal cross section through a vertical central axis of one form of the present invention.
Figure 5:
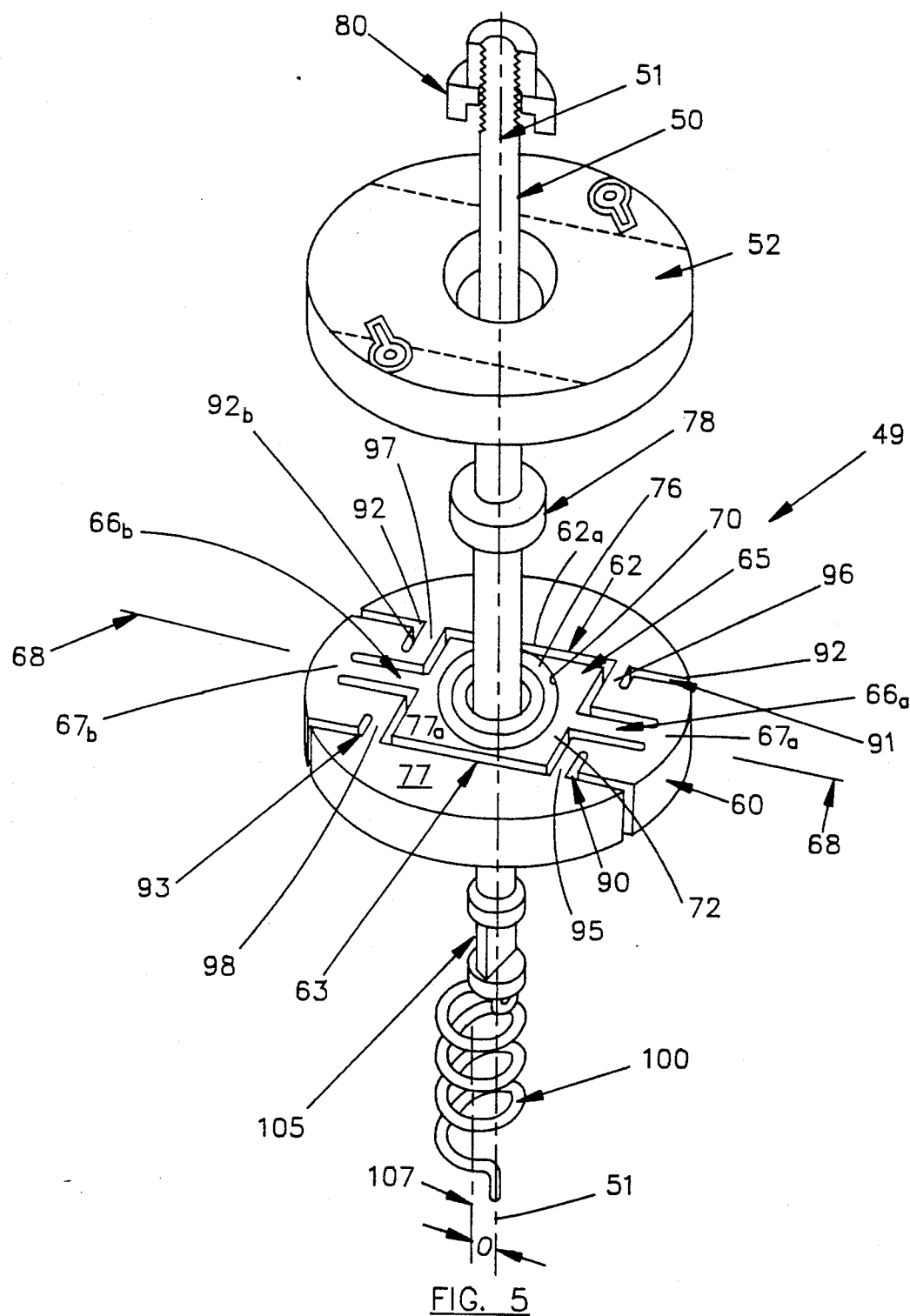
FIG. 5 is an exploded perspective view of the device shown in FIG. 4.

Referring now to FIGS. 4 and 5, a more detailed illustration is provided for the capacitor arrangement of the present invention. In the illustration in the drawings, the structure of a capacitance transducer 49, as illustrated, includes an elongated, cylindrically shaped central fastener rod 50 with a central longitudinal axis 51 which is shown vertically in FIG. 4. The rod 50 is part of a moment arm which couples an upper capacitor plate base member 52 to torsion beams in a lower capacitor plate base member 60. The upper base member 52 is cylindrically shaped and is made of a material having inherently dimensionally stable characteristics under changing environmental conditions such as temperature and time aging. Quartz is a suitable material.

Figure 5A:
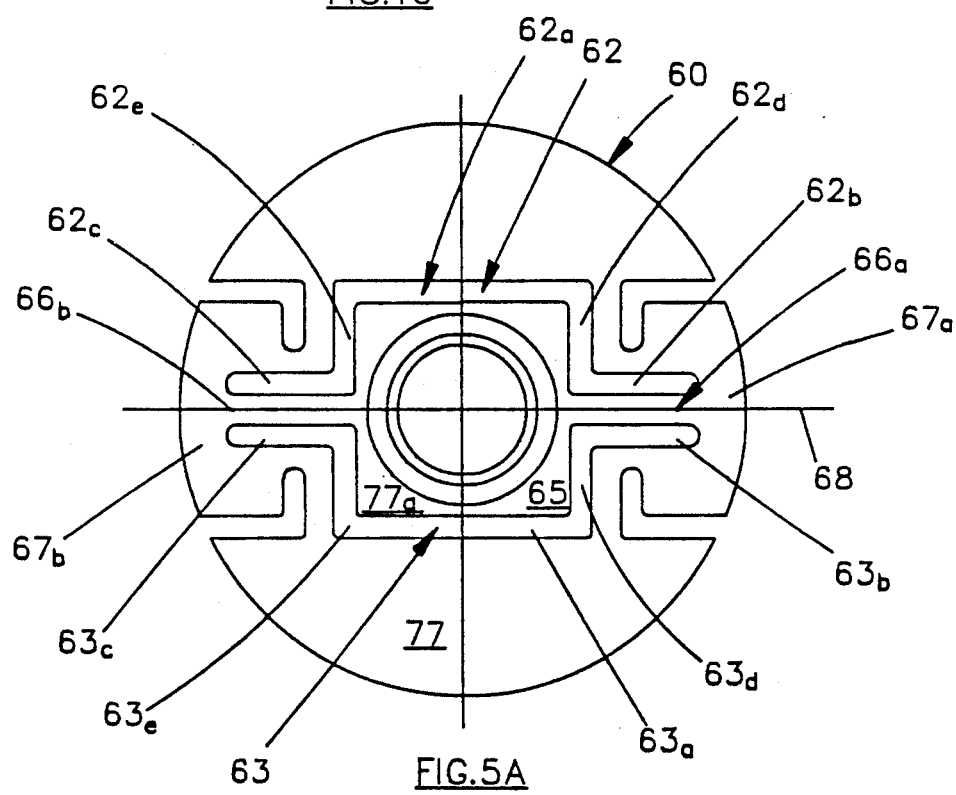
FIG. 5A is a plane view of the upper surface of the member 60 to illustrate the slot system.

As shown in FIG. 5 and FIG. 5a, the lower capacitor base member 60 is a cylindrically shaped metal plate member which has a first vertical slot configuration of slot systems 62,63 which are defined by vertical walls and which are tortuously located in the body of the lower base member 60. The first vertical slot configuration provides a central plate section 65 which is connected by spaced apart torsion beam members or sections 66a,66b to outer plate sections 67a,67b (see FIG. The beam members 66a,66b are rectangular shaped in cross section with a narrow dimension in a horizontal plane and a long dimension in a vertical plane. The beam members 66a,66b are adapted to be torqued about a central horizontal torque or displacement axis 68 where the torque or displacement axis 68 horizontal median plane extending through the lower base member 60. The displacement axis 68 also intersects and defines a vertical plane with the axis 50.

The central section 65 thus is a generally rectangularly shaped member defined between slots 62 and 63 which are symmetrically arranged with respect to the horizontal displacement axis 68.

As shown in FIG. 5A, the slot 62 has a central vertically walled portion 62a connected to parallel arranged vertically walled end portions 62b and 62c by transversely arranged vertical wall slot portions 62d and 62e. The slot 63 has similarly arranged portions 63a, 63b, 63c, 63d and 63e relative to the slot system 62. The spacing between the end portions 62b,63b and 62c,63c of the slots 62 and 63 define the narrow width dimension of the beam members 66a and 66b. The length of the slot portions 62b,63b and 62c,63c also defines the length of the beam members 66a and 66b.

In the center of the central section 65 and the base member 60 is a mounting bore 70 which is centered on the central axis 51 (see FIGS. 4 and 5). The bore 70 receives an annular outer tubular support ring 72. The outer support ring 72 is welded about its periphery at its top surface to the central section 65. Disposed within the outer support ring 72 (see FIG. 4) is an annular temperature compensation spacer 74 which is attached thereto by welding about its periphery at a lower surface junction. The temperature compensation spacer 74 can be of the type disclosed in U.S. Pat. No. 4,322,775. However, the compensation spacer 74 may not be necessary for all applications.

The temperature compensation spacer 74, in turn, has a bore which receives an inner tubular support member 76. The upwardly facing planar surface 77 of the outer plate sections of the lower base member 60 are on the same horizontal plane as the upper surface 77a of the center section 65. The down-wardly facing surface 79 of the upper base member 52 is parallel to the upper surface 77 of the lower base member 60. Between the inner support member 76 attached to the lower base member 52 and the upper base member is a disc shaped spacer member 78.

Figure 6:
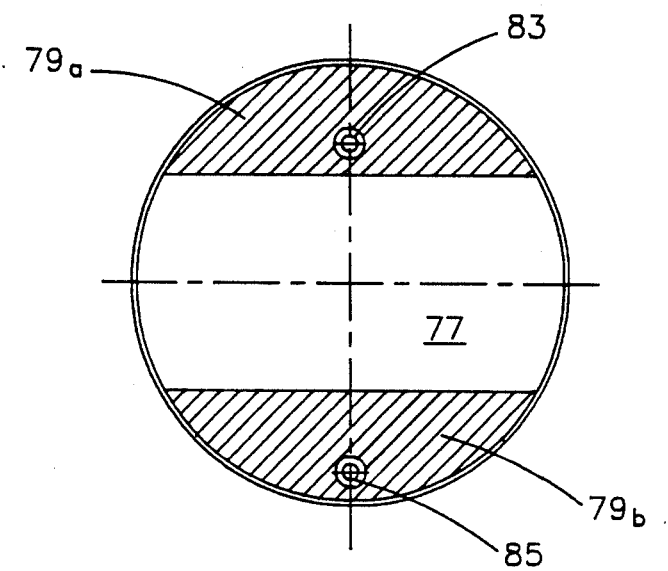
FIG. 6 is a plan view of the bottom surface of the upper capacitor base member of the invention.

The upper base member 52 has a centrally located opening for receiving the fastener rod 50. An upper clamping means 80 and a lower clamping means 82 threadedly attach to the rod 50 so that the upper and lower base members 52 and 60 are assembled in a unitary assembly. The spacer member 78, the rod 50, the clamping means 80 and 82, and the tubular member 72 can be made from a material which is selected to have similar temperature expansion characteristics to the selected material for the base member 52. A metal material such as Invar is suitable. The base member 60 is made from a high strength material, such as a maraging stainless steel with good elastic characteristics for the torsion beam members. The steel member also will provide an electrical ground for the capacitor electrical system. By way of illustration, the coefficient of expansion for various materials averages (at room temperature) as follows:

Invar—0.2 parts/million/oF
Maraging—6 parts/million/oF
Quartz—0.3 parts/million/oF The upper capacitor base member 52, as noted before, is a cylindrically shaped member preferably constructed from a quartz material and has first and second capacitance plate films 79a and 79b (see FIG. 6) which are sputtered in separate locations onto the lower surface 77 of the base member 52. The capacitance plate film 79a is arranged in vertical and spacial alignment with a planar surface 77 on the lower capacitance base member 60. Openings 83,85 extend from the plate surfaces 79a,79b so that the plate members 79a and 79b can respectively be electrically coupled by a film conductor to the top surface of the base member 52. Electrical wire conductors are then connectable to each capacitor film plate for separate capacitor measurements.

As shown in FIG. 4, the surface 79 is arranged normally parallel to the planar surface 77 on the lower capacitor base member 60 and is normally separated therefrom by a capacitor spacing distance or gap $D_1$. The capacitance plate films 79a and 79b which are offset from the central vertical axis 51 (see FIG. 6) are similarly spaced parallel to the planar surface 77 on the lower base member 60. The widths of the capacitor gap between the respective plate films 79a,79b and the surface 77 is basically defined by the width of the spacer member 78. It can thus be appreciated that the upper and lower clamping means 80,82 on the fastener rod 50 attach the upper capacitor base member 52 to the inner support ring 76 and, in turn, to the central section 65 of the lower capacitor base member 60. The torque or displacement axis 68 intersects a median horizontal plane of the lower capacitor base member 60 and upon the application of torque about the torque axis 68, the clamped assembly will be angularly torqued about the torque axis 68 thus changing the capacitance spacings or gaps between the capacitor film plates. As the respective capacitance spacings or gaps are decreased or increased, the related capacitor gap is increased or decreased.

Referring again to FIGS. 5 and 5A, the lower capacitor base member 60 is also provided with a second vertical wall slot system comprised of angular "L" shaped slots 90,91,92 and 93 which are symmetrically arranged about the circumference of the base member 60. The sidewalls of the slot portions 90a,93a of the sidewalls of slots 90,93 align the sidewalls of the slot portion 63a of the slot 63. The sidewalls of the slot portion 91a,92a of the slots 91,92 align in vertical planes with the sidewalls of the slot portion 62a of the slot 63. The sidewalls of the slot portions with one another and are perpendicularly arranged relative to the displacement axis 68. Similarly, the sidewalls of the slot portions 92b and 93b are aligned in vertical planes with one another and are perpendicularly arranged relative to the displacement axis 68. It can be seen that the slot portions 90b,63d and the slot portions 91b and 62b, respectively, define transverse beam portions 95,96 about an axis perpendicular to the displacement axis 68. Similarly the slots 92 and 93 define beam portions 97 and 98 which are perpendicular to the displacement axis 68. The purpose of this arrangement is to minimize temperature effects which will be explained more fully hereafter.

The torquing of the beam members 66a,66b on the central section 65 of the lower base member 60 is accomplished by a spirally wound bourdon tube 100 (FIG. 5). The bourdon tube 100 has a closed stub end 101 (FIG. 4) which is aligned with the central axis 51 and is attached by a force connector 105 to a threaded cap 106 on the rod 50. The force connector 105 has cylindrically shaped end portions 105a,105b and an elongated connector portion 105c with a rectangular cross section. A transverse axis 105d through the connector portion 105c is normal or perpendicular to the horizontal axis 68. The spirally wound bourdon tube 100 has a central vertical axis 107 offset by a dimension "0" from the vertical axis 51. When the bourdon tube is subjected to internal pressure it will produce a force in a vertical plane defined by the axis 105d and the axis 51.

Figure 7:
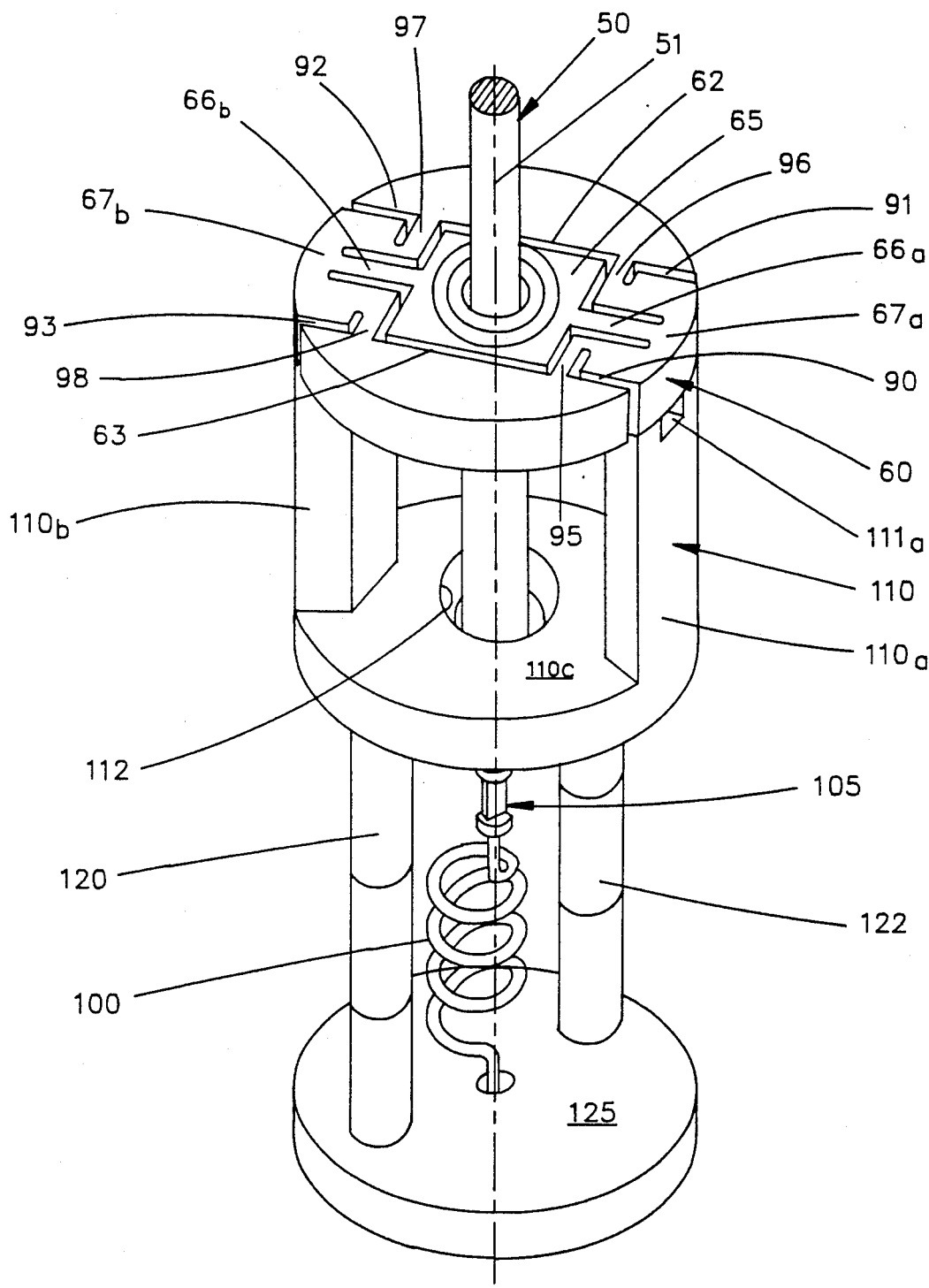
FIG. 7 is a perspective view of the apparatus of FIG. 4 in a support mounting for illustrating heat paths., FIG. 8. is a side view of a transducer as shown in FIG. 7.

Referring now to FIG. 7, for an explanation of temperature compensation, the lower base member 60 is attached to semi-circular vertical wall segments 110a, 110b of a first support member 110. The wall segments 110a,110b extend upwardly from a cylindrically shaped base member 110c. The vertical wall segments 110a,110b, respectively, have upper segmental portions which are attached to the solid part of the lower base member 60 on each side of the beam member 66a or 66b. Temperature effects conducted to the unit can change the temperature of the base member 110c so as to expand or contract it more than base member 60 whose temperature lags due to the time required for conduction through transverse beams 110a and 110b. The transverse beams 95,96 and 97,98 defined by the second slot system tend to isolate the center section 65 from the temperature induced moment on base member 67a and 67b by the wall segments 110a,110b. The wall to provide clearance for the torque beam members which are attached to the center section 65. The first support member 110 has a central opening 112 through which the force connector 105 extends. The wall segments 110a,110b attached to the solid portions of the base member 60 and are symmetrical located with respect to a vertical plane defined by the displacement axis 68 and the central axis 51.

The first support member 110 is, in turn, supported by diametrically arranged composite rods 120,122. The rods 120,122 have their central longitudinal axes aligned in a vertical plane which is perpendicular to a plane defined by the axis 68 and 51. The composite rods 120 and 122 attach to another cylindrically shaped support member 125. The rods are made from materials having selected expansion characteristics but the end sections are chosen to be the same material as the plate members they attach to. This avoids dissimilar metal effects except for the central section. The bourdon tube 100 is attached between the upper member 125 and the force connector 105.

As may be appreciated from FIGS. 5 and 7, the base member 60, the first support member 110, the rods 120,122 constitute a first expansion unit assembly and the base member 52, the rod 50, the central section 65, the connector 84 and the bourdon tube 100 constitute a second expansion unit assembly. By selecting the materials relative to coefficients of expansion and length dimensions for the rods 120,122, temperature changes produce equal displacement of the second expansion unit assembly relative to the first expansion unit assembly and compensate for changes in dimensions due to temperature.

Figure 8:
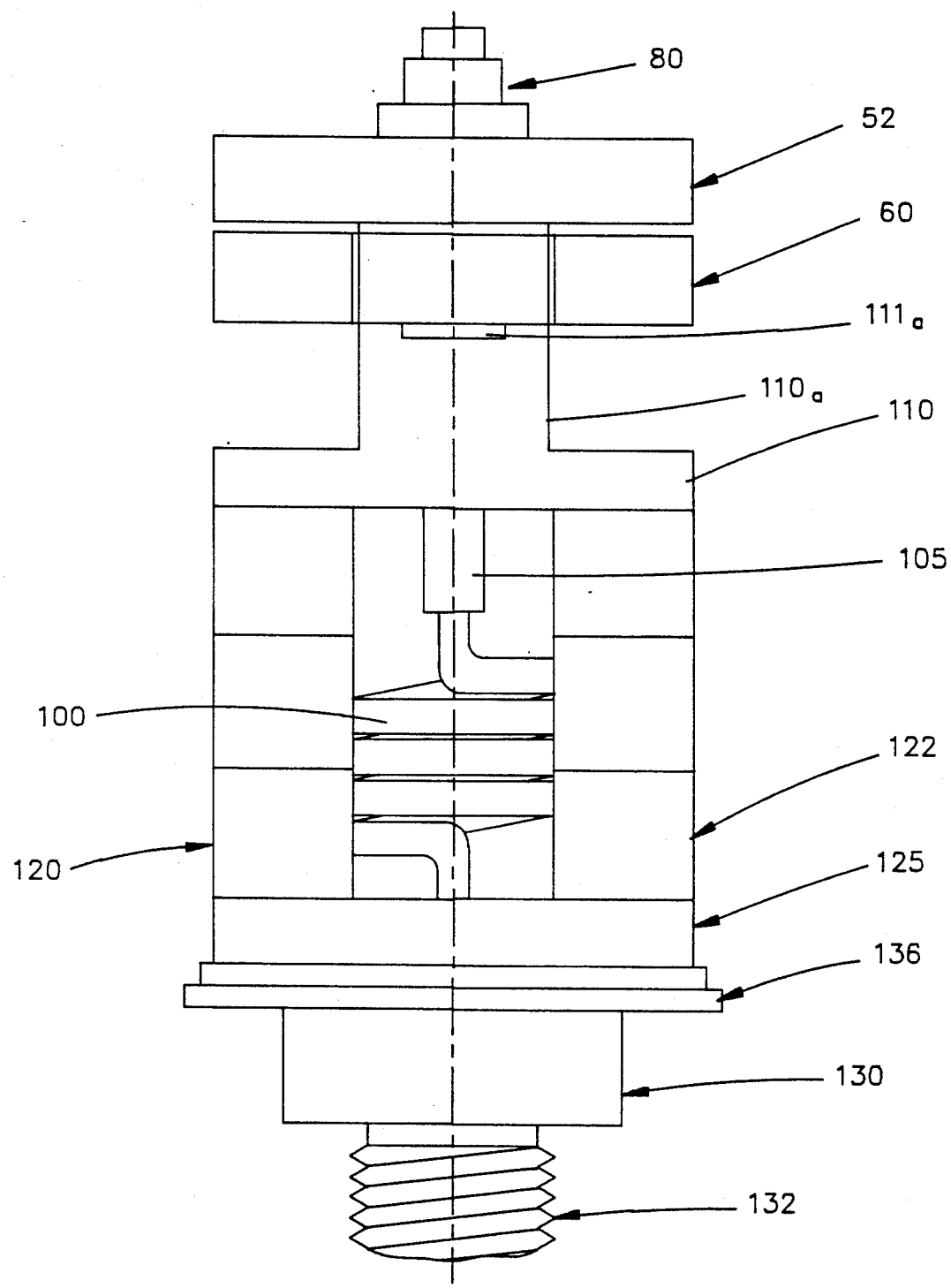
Figure 9:
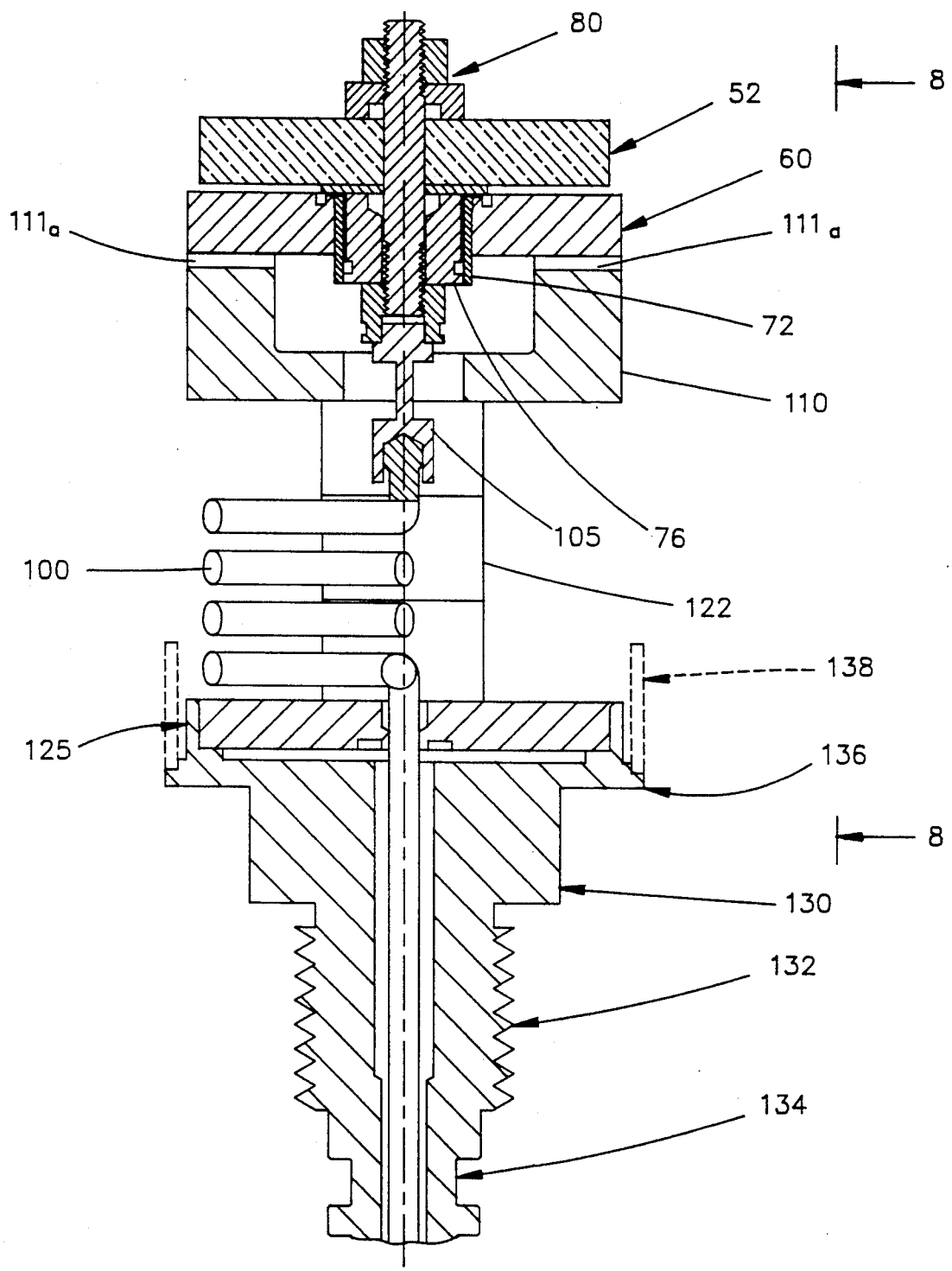
FIG. 9 is a view in a longitudinal cross section of the device of FIG. 8 but taken along a plane normal to the plane of the drawing.

Referring now to FIGS. 8 and 9, a capacitance transducer embodying the present invention is shown in a typical mounting for a pressure sensing system. The support or base member can assume many configurations but in FIGS. 8 and 9 is shown as a tubular member 130 having a lower external threaded portion 132 for threaded coupling in a tool or pressure probe to receive a pressure medium for a pressure measurement. Grooves 134 for O-ring and pressure seals are provided. The member 130 has a flange 136 which receives a tubular enclosure housing 138 (shown in dashed line). In practice, the interior of the enclosure housing 138 is at a vacuum or contains inert gas for the capacitance. The member 136 has an upper internal tubular end which receives the support member 125. The support member 125 has a central opening which receives a tubular end 109 of the bourdon tube 100. The end 109 of the bourdon tube is attached by welding to the support member 125. The cylindrically shaped rods 120,122 are metal and materials are attached to the first support member 110. The longitudinal axes of rods 120,122 lie in a vertical plane in alignment with the direction of force produced by the bourdon tube 100. The first support member 110 is attached by welding to the lower base member 60 at a location where the displacement axis 68 through the torsion beams 66a,66b are in a vertical perpendicular to the vertical plane through the rods 120,122. In FIGS. 8 and 9, the temperature compensation ring 74 is not shown and the tubular member 72 attaches directly to the tubular member 76. The temperature compensation ring 74 is not required for all applications.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. In utilizing micro-elastic characteristics a low or small force produces a small deflection. As an example, a one to two pound force is used to produce a capacitance deflection of 500 micro-inches. This arrangement for high pressure 10,000–15,000 psi, utilizes a bourdon tube coupled to a capacitor transducer. The capacitor transducer utilizes a relatively small deflection so that the primary determining element is the torque beams which have very low stress levels. The bourdon tube then operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and non-linear response as stress levels are reduced.

The stress levels in obtaining micro-elastic characteristics are low because the deflection required for the capacitor sensor can be small, for example 500 micro-inches. The beam members providing the displacement axis are stiff or rigid and the torque force applied is low, for example two pounds.

By way of example, the diameter of the base member 52 is about 0.850 inches. The diameter of the base member 60 is about 0.900 inches and 0.125 inches thick. the width of the slots is about 0.020 inches. The spacer 78 is 0.001 inches thick.

While the preferred embodiment is to exploit micro yield characteristics to produce accuracy and repeatability, macro yield materials may be suitable for some applications.

A bourdon tube as contrasted to a circular tube has a flattened or ovular cross section as compared to a circular cross section. In high pressure applications a flat oval cross section is commonly employed. In a flattened cross section, internal pressure produces higher stress in the wall because the member tends to move toward a circular cross sectional form. When a tube member with a flattened cross section is spirally wound, internal pressure tends to uncurl the spiral. The flatness of the tube, the coil diameter and the wall thickness also have a bearing on the stress.

In the present invention, the spiral end of a spirally wound bourdon tube is connected to a metal base member which is constructed to enable torsional deflection of a beam member as a function of the applied pressure in the bourdon tube. Bourdon tube design is well known, and the design should minimize the stress in the bourdon tube to develop a low force for the beam members. With the use of torsional deflection in the base member, a capacitance base member located at a distance from the center of deflection is displaced to change capacitance values. There is zero force on the capacitance plates. In short, the capacitance members are moved relative to one another by angular deflection of the capacitor base members. Because the force moment of the bourdon tube is small, the stress level in the torque beam can be kept low. The use of high performance metal alloys can then provide near perfect elastic and stability characteristics of the torsion beam.

By way of example a bellows with a 0.250 inch O.D., 0.150 inch I.D. and an effective area of 0.028 square inches will produce a force of 280 pounds at 10,000 psi and zero deflection. By way of contrast a bourdon tube with a coil O.D. of 0.450 inches, a flat dimension of 0.08 inches, a circular O.D. of 0.092 inches and a wall thickness of 0.017 inches develops about 2 pounds force at 10,000 psi. Thus for high pressure a bourdon tube can be used to develop low forces at high pressures. High pressures can be defined as 500 psi upward. On the other hand, at low pressures (0 to 100 psi) a small bourdon tube does not produce sufficient force whereas a small bellows will produce the desired low force.

The effect of temperature on the torque output of a bourdon tube is minimized by the spiral winding of the bourdon tube which creates a symmetry about the coil axis which significantly rejects the effects of temperature.

Temperature can also affect the capacitance structure. The top base member of the capacitor is preferably a low expansion material which is dimensionally stable, such as quartz. The lower capacitance member is preferably made of the same material as the torque beam to avoid welds. A stainless steel 17-4 is suitable.

The two capacitance plates are respectively mounted by aligned connections to a base member which, in turn, is attached to another mass. Since the structure is mounted in a vacuum, temperature change of the capacitance plates is affected primarily by thermal conduction through the mountings. The central mounting on the rear mass serves to conduct heat into the mass essentially equally to both sides. Additionally the mass serves to diffuse any temperature gradients so that heat arrives equally to the supporting points of a plate. Thus, temperature changes tend to closely track between the two capacitor plates and minimize any effect of temperature changed.

A precision sensor should also be insensitive to its orientation with respect to gravity. Balancing of the sensor of this invention is accomplished by adjusting the various weight factors in a well known manner. Because of the relative stiffness of the structure in the vertical direction, balancing is a straight forward application.

The electronics used for this sensor is the same as described in Pat. No. 4,091,693. A ratio metric measurement is made using the relationship $(C_1-C_2)/(C_1+C_2)$ so that the oscillator factor cancels out of the reading. One of the important features of the present invention is that the capacitor can operate with minute deflection changes and produce measurable signals.

Figure 10:
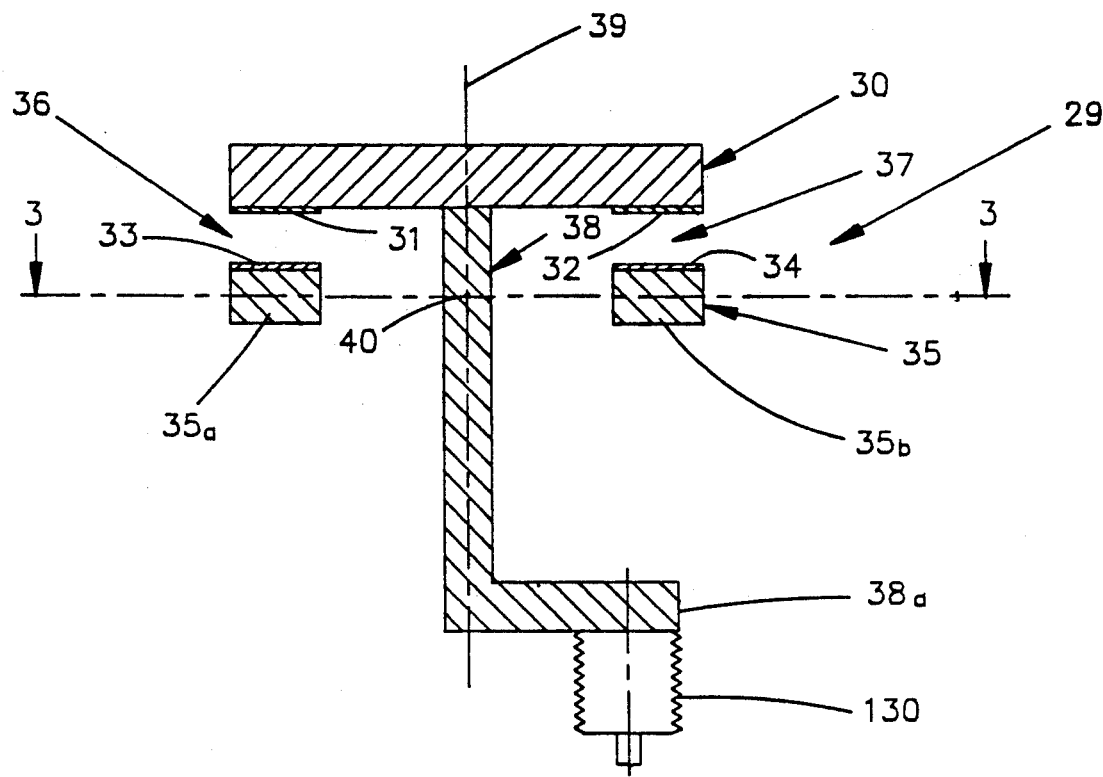
FIG. 10 is a schematic illustration similar to FIG. 1 but illustrating another form of the invention.

In FIG. 10, another form of the invention is shown for low pressure applications. The structure is arranged as illustrated in FIG. 2, and a metal bellows 130 is applied to the end of a moment arm 38a which is offset from the axis 39. The offset of the force axis of the bellows in conjunction with the force developed by the bellows determine the moment force applied and the deflection displacement of the bellows. The bellows at low pressures will generate a low enough force to permit accurate elastic characteristics of metals to be employed. It should be noted that no rotational force coupler is required for a bellows application because of the flexibility of the bellows.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A dual capacitor device for utilizing dependent capacitances for measurement purposes comprising:
an upper capacitor base member and a lower capacitance base member arranged with parallel capacitor surfaces in horizontal planes where said parallel capacitor surfaces are located on opposite sides relative to a vertical central axis and said capacitance surfaces define first and second capacitors;
said lower capacitor base member having a centrally located section connected to an outer section of said lower capacitor base member by torsion beam means, said centrally located section being attached to said upper capacitor base member by a vertical arm member;
said torsion beam means having a displacement axis normal to said central axis so that angular displacement of said torsion beam means and said centrally located section about said displacement axis produces a capacitance change in said first and second capacitors;
force means coupled to said centrally located section for producing a torsion force on said torsion beam means for developing angular displacement of said centrally located section and a capacitance change as a function of said torsion force.

2. The capacitor device as set forth in claim 1 wherein the torsion beam means has a rectangular cross section with long and short dimensions relative to first vertical plane orientations which are parallel to said central axis and wherein said long dimensions are parallel to said central axis,
said force means including a moment arm member extending along said central axis where said moment arm member extends below said lower capacitor base member and where said torsion force is applied to said moment arm at a location below said lower capacitor base member.

3. The capacitor device as set forth in claim 2 wherein said lower capacitor base member has a first vertically walled slot means which define a central portion coupled to said moment arm and which define said torsion beam means where said torsion beam means connect to an outer base portion of said lower capacitor base member.

4. The capacitor device as set forth in claim 3 wherein said lower capacitor base member has a second vertically walled slot means which define transverse torsion beam means where said transverse torsion beam means are in said outer base portion of said lower capacitor base member and are located in a plane transverse to said first vertical plane.

5. The capacitor device as set forth in claim 3 wherein the torsion beam means are constructed from a high strength metal material having good elastic characteristics and wherein the force means is a bourdon tube arranged for developing a torsion force which does not exceed the micro yield point of the torsion beam means.

6. The capacitor device as set forth in claim 5 and further including a force connector member in said force means where said force connector member is coupled between said bourdon tube and said moment arm, said force connector member having rectangular cross sections in transverse horizontal plane orientations to said first vertical plane orientations with long dimensions normal to the short dimensions of the torsion beam means.

7. The capacitor device as set forth in claim 1 wherein the torsion beam means are constructed from a high strength metal material having good elastic characteristics and wherein the force means is a bourdon tube arranged for developing a torsion force which does not exceed the micro yield point of the torsion beam means.

8. The capacitor device as set forth in claim 7 wherein said force means includes a moment arm member extending to a location below said lower capacitor base member,
said bourdon tube having a closed end and an open end which are aligned along a common axis with the central portion of said bourdon tube and with the central portion of the bourdon tube arranged in a spiral about a bourdon tube coil axis which is offset laterally from and parallel to said common axis, said common axis being aligned with said central axis and said closed end being coupled to said moment arm so that the bourdon tube develops a force in a direction normal to said common axis.

9. The capacitor device as set forth in claim 8 and further including a force connector member in said force means where said force connector member is coupled between said bourdon tube and said moment arm, said force connector member having rectangular cross sections in transverse horizontal plane orientations to said first vertical plane orientations with long dimensions normal to the short dimensions of the torsion beam means.

10. The capacitor device as set forth in claim 9 wherein the torsion beam means has a rectangular cross section with long and short dimensions relative to first vertical plane orientations which are parallel to said central axis and wherein said long dimensions are parallel to said central axis, said force means including a moment arm member extending along said central axis where said moment arm member extends below said lower capacitor base member and where said torsion force is applied to said moment arm at a location below said lower capacitor base member.

11. The capacitor device as set forth in claim 10 wherein said lower capacitor base member has a first vertically walled slot means which define a central portion coupled to said moment arm and which define said torsion beam means where said torsion beam means connect to an outer base portion of said lower capacitor base member.

12. The capacitor device as set forth in claim 11 wherein said lower capacitor base member has a second vertically walled slot means which define transverse torsion beam means where said transverse torsion beam means are in said outer base portion of said lower capacitor base member and are located in a plane transverse to said first vertical plane.

13. The capacitor device as set forth in claim 1 and including support means attached to said outer base portion of said lower capacitor member adjacent to said torsion beam means.

14. The capacitor device as set forth in claim 13 wherein the torsion beam means are constructed from a high strength metal material having good elastic characteristics and wherein the force means includes a bourdon tube arranged for developing a torsion force which does not exceed the micro yield point of the torsion beam means and said bourdon tube is attached to said support means.

15. The capacitor device as set forth in claim 14 wherein said force means includes a moment arm member extending to a location below said lower capacitor base member, said bourdon tube having a closed end and an open end which are aligned along a common axis with the central portion of said bourdon tube with the central portion of the bourdon tube arranged in a spiral about a bourdon tube coil axis which is offset laterally from and parallel to said common axis, said common axis being aligned with said central axis and said closed end being coupled to said moment arm so that the bourdon tube develops a force in a direction normal to said common axis.

16. The capacitor device as set forth in claim 15 and further including a force connector member in said force means where said force connector member is coupled between said bourdon tube and said moment arm, said force connector member having rectangular cross sections in transverse horizontal plane orientations to said first vertical plane orientations with long dimensions normal to the short dimensions of the torsion beam means.

17. The capacitor device as set forth in claim 16 wherein said lower capacitor base member has a first vertically walled slot means which define a central portion coupled to said moment arm and which define said torsion beam means where said torsion beam means connect to an outer base portion of said lower capacitor base member.

18. The capacitor device as set forth in claim 17 wherein said support means includes arcuate wall segments diametrically arranged and attached to said outer base portion.

19. The capacitor device as set forth in claim 18 wherein said support means further includes diametrically arranged rod members connected by a horizontal plate member to said wall segments where said rod members are disposed in a vertical plane orientation which is transverse to a vertical plane orientation for said wall segments.

20. The capacitor device as set forth in claim 19 wherein the support means have a material construction providing an effective thermal co-efficient of expansion which is substantially equal to the effective thermal co-efficient of expansion for the material construction of the upper base member, torsion beam means and force means.

21. The capacitor device as set forth in claim 1 wherein the torsion beam means are constructed from a high strength metal material having good elastic characteristics with a macro yield point above the working stress levels in said torsion beam means.

22. The capacitor device as set forth in claim 1 wherein the torsion beam means are constructed from a material having good elastic characteristics with a micro yield point above the working stress levels of the torsion beam means.

23. The capacitor device as set forth in claim 1 wherein the torsion beam means are constructed from a high strength metal material having good elastic characteristics in the stress range of the torsion mean means.

24. The capacitor device as set forth in claim 1 wherein the force means is a bourdon tube arranged for developing a torsion force which does not exceed the micro yield point of the torsion beam means.

25. The capacitor device as set forth in claim 1 wherein the torsion beam means are constructed from a high strength metal material having good elastic characteristics and wherein the force means is a bellows arranged for developing a torsion force which does not exceed the micro yield point of the torsion beam means.

26. The capacitor device as set forth in claim 1 wherein the torsion beam means are constructed from a high strength metal material having good elastic characteristics and wherein the force means is a bellows arranged for developing a torsion force which does not exceed the macro yield point of the torsion beam means.

27. A method of measuring capacitance in a dual capacitor device utilizing dependent capacitances for measurement purposes and wherein the capacitor device has an upper capacitor base member and a lower capacitance base member arranged with parallel capacitor surfaces in horizontal planes where said parallel capacitor surfaces are located on opposite sides relative to a vertical central axis and said capacitance surfaces define first and second capacitors having first and second capacitance gaps comprising the steps of:

torquing said upper capacitor base member about a horizontal displacement axis located in a torsion beam means disposed normal to said central axis and in a horizontal plane in said lower base member by applying a moment force about said displacement axis so that angular displacement of said upper base member about said displacement axis produces a dependent change in said capacitance gaps of said first and second capacitors; and maintaining the force and the force moment below the yield point of the torsion beam means to minimize permanent distortion in said torsion beam means.

28. A method of measuring capacitance in a dual capacitor device as set forth in claim 27 wherein the force and the force moment are maintained below the macro yield point of the torsion beam means.

29. A method of measuring capacitance in a dual capacitor device as set forth in claim 27 wherein the force and the force moment are maintained below the micro yield point of the torsion beam means.

30. A method of measuring capacitance in a dual capacitor device utilizing dependent capacitances for measurement purposes and wherein the capacitor device has an upper capacitor base member and a lower capacitance base member arranged with parallel capacitor surfaces in horizontal planes where said parallel capacitor surfaces are located on opposite sides relative to a vertical central axis and said capacitance surfaces define first and second capacitors having first and second capacitance gaps and wherein the lower capacitance base member has torsion beam means disposed along a horizontal displacement axis with the torsion beam means coupled to a vertical moment arm on the upper capacitor base member comprising the steps of:

torquing said upper capacitor base member about said horizontal displacement axis located in a torsion beam means by applying a force to said moment arm for developing a moment force about said displacement axis and develop an angular displacement of said upper base member about said displacement axis for producing a dependent change in said capacitance gaps of said first and second capacitors., and maintaining the force below the yield point of the torsion beam means to minimize permanent distortion in said torsion beam means.

31. A method of measuring capacitance in a dual capacitor device utilizing dependent capacitances for measurement purposes as set forth in claim 30 and further including developing said force with a spirally wound bourdon tube arranged to develop a force on the moment arm in a direction normal to displacement axis.

32. A method of measuring capacitance in a dual capacitor device as set forth in claim 31 wherein the force and the force moment are maintained below the macro yield point of the torsion beam means.

33. A method of measuring capacitance in a dual capacitor device as set forth in claim 31 wherein the force and the force moment are maintained below the micro yield point of the torsion beam means.

* * * * *